United States Patent

Atsuta

[11] Patent Number: 5,656,881
[45] Date of Patent: Aug. 12, 1997

[54] VIBRATION WAVE DRIVEN MOTOR

[75] Inventor: Akio Atsuta, Yokohama, Japan

[73] Assignee: Canon Kabushiki Kaisha, Tokyo, Japan

[21] Appl. No.: 190,576

[22] Filed: Feb. 2, 1994

Related U.S. Application Data

[63] Continuation of Ser. No. 680,233, Apr. 3, 1991, abandoned.

[30] Foreign Application Priority Data

Apr. 5, 1990 [JP] Japan .................. 2-90657

[51] Int. Cl.$^6$ ................................. H02N 2/00
[52] U.S. Cl. .......................... 310/316; 310/323
[58] Field of Search ................. 310/316–319, 310/323, 328, 358

[56] References Cited

U.S. PATENT DOCUMENTS

| | | | |
|---|---|---|---|
| 3,843,897 | 10/1974 | Mishiro | 310/323 |
| 3,889,166 | 6/1975 | Scurlock | 310/316 |
| 4,325,255 | 4/1982 | Howard et al. | 73/589 |
| 4,484,099 | 11/1984 | Kawai et al. | 310/317 |
| 4,504,760 | 3/1985 | Yamamoto et al. | 310/323 |
| 4,645,964 | 2/1987 | Hiramatsu et al. | 310/323 |
| 4,697,117 | 9/1987 | Mishiro | 310/323 |
| 4,713,571 | 12/1987 | Suzuki et al. | 310/316 |
| 4,734,610 | 3/1988 | Okumura et al. | 310/323 |
| 4,749,896 | 6/1988 | Suzuki et al. | 310/316 |
| 4,764,702 | 8/1988 | Mishiro | 310/323 |
| 4,786,836 | 11/1988 | Tokushima | 310/323 |
| 4,833,358 | 5/1989 | Suzuki et al. | 310/316 |
| 4,893,045 | 1/1990 | Honda | 310/323 |
| 4,933,590 | 6/1990 | Inoue et al. | 310/323 |
| 5,025,766 | 6/1991 | Yamauchi et al. | 123/472 |
| 5,065,999 | 11/1991 | Kataoka et al. | 271/265 |
| 5,122,700 | 6/1992 | Tamai et al. | 310/323 |
| 5,124,611 | 6/1992 | Tamai et al. | 310/317 |
| 5,134,348 | 7/1992 | Izukawa | 318/116 |

FOREIGN PATENT DOCUMENTS

| | | | |
|---|---|---|---|
| 0401762 | 12/1990 | European Pat. Off. | 310/328 |
| 0406843 | 9/1991 | European Pat. Off. | H01L 41/09 |
| 0240380 | 10/1988 | Japan | 310/323 |
| 1148079 | of 1989 | Japan | H02N 2/00 |

Primary Examiner—Thomas M. Dougherty
Attorney, Agent, or Firm—Fitzpatrick, Cella, Harper & Scinto

[57] ABSTRACT

A vibration wave driven motor includes a vibrator, a plurality of driving electro-mechanical energy conversion element portions disposed in the direction of lamination relative to the vibrator, frequency signals of different phases being applied to the conversion element portions, and a monitoring electro-mechanical energy conversion element provided in the vibrator in the direction of lamination relative to the conversion element portions.

63 Claims, 10 Drawing Sheets

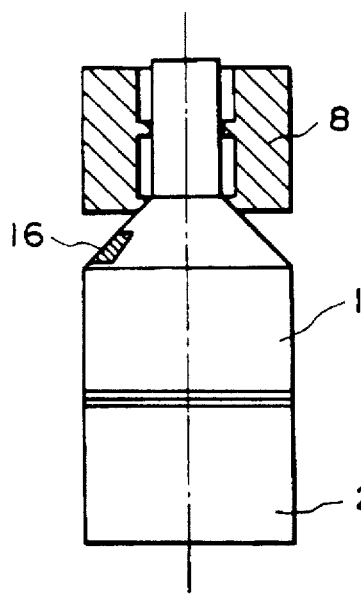
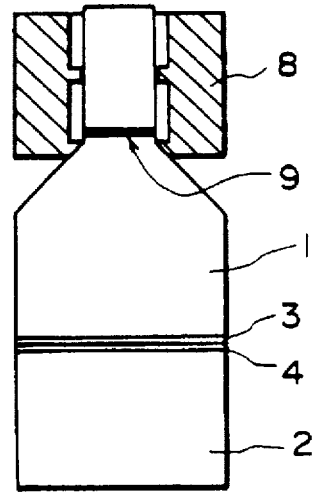
FIG. 9  FIG. 10
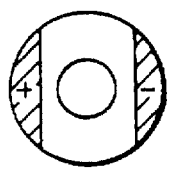
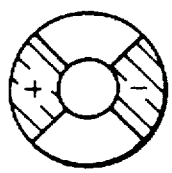
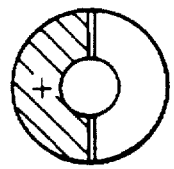
FIG. 11A  FIG. 11B  FIG. 11C
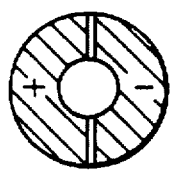
FIG. 11D

VIBRATION WAVE DRIVEN MOTOR

This application is a continuation of application Ser. No. 07/680,233 filed Apr. 3, 1991 now abandoned.

BACKGROUND OF THE INVENTION

1. Field of the Invention

This invention relates to a motor generating mechanical power without resorting to electromagnetic power, and more particularly to a bar-shaped ultrasonic motor (vibration wave driven motor) which utilizes circular motion excited in a vibrator by the combination of expansive and contractive vibrations in the axial direction to rotate a driven member fitted coaxially with the vibrator by frictional driving.

2. Related Background Art

A motor as shown for example in FIG. 13 of the accompanying drawings has heretofore been proposed as an ultrasonic motor (vibration type motor) of this type in U.S. patent application Ser. No. 586,303.

In FIG. 13, the reference numeral 1 designates a vibration member comprising a metallic round bar having a small-diametered shaft portion 1a forming a fore end portion, a large diametered shaft portion 1b forming a rear end portion, and a horn-shaped horn portion 1c formed between the small-diametered shaft portion 1a and the large-diametered shaft portion 1b and having a diameter progressively decreasing toward the fore end portion, the reference numeral 2 denotes a keep member comprising a metallic round bar formed to the same outer diameter as the large-diametered shaft portion 1b of the vibration member 1 and having a bolt insertion hole 2a formed along the axis thereof, the reference numerals 3 and 4 designate circular ring-shaped piezo-electric element plates formed to the same outer diameter as the large-diametered shaft portion 1b, and the reference numeral 5 denotes the electrode plate of the piezo-electric element plates 3 and 4. The piezo-electric element plates 3 and 4 with the electrode plate 5 interposed therebetween are disposed between the vibration member 1 and the keep member 2, and the keep member 2 is fixed to the vibration member 1 by a bolt 6, whereby the piezo-electric element plates 3 and 4 are fixed between the vibration member 1 and the keep member 2 to thereby constitute a vibrator A. The bolt 6 has its head in contact with the keep member 2 with a circular ring-shaped insulator 7 interposed therebetween and has its shank portion held in non-contact with respect to the piezo-electric element plates 3, 4 and the electrode plate 5.

The piezo-electric element plates 3 and 4 each have on one surface thereof two electrodes (plus electrode a and minus electrode b) differing in the direction of polarization from each other and polarized in the direction of thickness, said two electrodes being symmetrically formed on the opposite sides of an insulating portion d formed on the center line, and have formed on the other surface thereof an electrode c common to the plus electrode a and the minus electrode b, and are disposed with a positional phase difference of 90° therebetween with respect to the axis of the vibrator A. The polarized electrodes (the plus electrode a and the minus electrode b) of the piezo-electric element plate 3 are in contact with the rear end surface of the vibration member 1 which is an electrical conductor, and the piezo-electric element plate 4 is in contact with the front end surface of the keep member 2 which is an electrical conductor.

An AC voltage $V_1$ is applied to between the electrode plate 5 and the vibration member 1 and an AC voltage $V_2$ is applied to between the electrode plate 5 and the keep member 2, whereby the vibrator A is vibrated by the combination of vibration caused by the expansive and contractive displacement of the piezo-electric element plate 3 in the direction of thickness thereof and vibration caused by the expansive and contractive displacement of the piezo-electric element plate 4 in the direction of thickness thereof.

The AC voltage $V_1$ and the AC voltage $V_2$, as shown in FIG. 14 of the accompanying drawings, are identical in amplitude and frequency and have a difference of 90° in time and spatial phases therebetween.

Thus, the vibrator A makes circular motion like that of the rope used in rope skipping (hereinafter referred to as the rope-skipping) about the axis thereof. The principle on which such circular motion occurs is described in detail in the above mentioned U.S. application Ser. No. 586,303, etc. and therefore need not be described herein.

As shown in FIG. 15 of the accompanying drawings, a rotor 8 is fitted coaxially with the axis l of the vibrator A, and the rear end portion (hereinafter referred to as the frictional contact portion) 8b of the inner diameter portion of the rotor 8 extends to a location corresponding to a sliding portion B, and the frictional contact portion 8b is brought into contact with the sliding portion B of the horn portion 1c. The horn portion is provided to obtain an appropriate frictional force in the sliding portion B by being subjected to an axial pressure force. This sliding portion B provides the loop of the rope-skipping in the vibration member 1.

The bore of the inner diameter portion 8a of the rotor 8 is of such structure that in the vibration member 1, it contacts with the position of the mode of the rope-skipping with a member 8d of low coefficient of friction interposed therebetween, and the rotor 8 is provided with an escape 8c to prevent the inner diameter portion from contacting with any vibration created in the other portions than the sliding portion B and producing of sounds.

The frictional contact portion 8b of the rotor 8 diverges into such a shape that the inner diameter thereof conforms to the outer peripheral shape of the sliding portion B, which progressively increases, and surface-contacts with the sliding portion B during the rope skipping motion of the vibration member 1.

The rotor 8 is pushed for example, in the direction of arrow in FIG. 15 by a spring or the like, not shown, through a thrust bearing, not shown, thereby producing a predetermined frictional force in the portion of contact between the frictional contact portion 8b and the sliding portion B by the sliding portion having the aforedescribed appropriate progressively increasing diameter, and also is permitted axially rotate by the thrust bearing.

From the above-described structure, there is realized an ultrasonic motor (a vibration wave driven motor) in which the vibration of the vibration member 1 is transmitted as a rotational force to the frictional contact portion 8b of the rotor to thereby rotate the rotor.

Generally, however, the ultrasonic motor (vibration type motor) of this kind has a resonance frequency of the order of several tens of kilohertz, and unless it is driven in the vicinity of this frequency, a great amplitude will not be obtained and such motor will not operate as a motor. Also, the resonance frequency of the motor fluctuates depending on environmental conditions such as temperature and humidity and load conditions.

This leads to the problem that the number of rotations become unstable if the motor is driven at a predetermined frequency.

SUMMARY OF THE INVENTION

One aspect of the application is to provide a bar-shaped ultrasonic motor (vibration wave driven motor) in which an AC electric field is applied to an electro-mechanical energy conversion element disposed on a bar-shaped vibrator, whereby the bar-shaped vibrator is caused to excite vibrations of bending modes of the same shape having a phase difference in terms of time therebetween in a plurality of planes, thereby causing the surface particles of a vibration member to make circular to elliptical motion and creating relative motion by frictional driving between the vibration member and a member pressed against the vibration member, and wherein the vibrator is provided with a vibration detecting electro-mechanical energy conversion element, whereby the vibrated state can be detected.

One aspect of the application is to provide under the above object a motor in which said vibration detecting conversion elements are disposed in an annular shape at a position in the direction of thickness of the bar-shaped vibrator.

One aspect of the application is to provide under the above object an apparatus in which said annular conversion element is bisected and the bisected elements are polarized in different directions to monitor the vibrated state.

One aspect of the application is to provide a motor in which said conversion element is laminated in a plurality of directions of thickness so that a detection signal may be taken out.

Other objects of the present invention will become apparent from the following detailed description of some embodiments of the invention taken in conjunction with the accompanying drawings.

BRIEF DESCRIPTION OF THE DRAWINGS

FIG. 9 is a side view showing a fourth embodiment of the present invention.

FIG. 10 is a side view showing a fifth embodiment of the present invention.

FIGS. 11(a)–11(d) show the electrode patterns of a vibration detecting piezo-electric element used in the motor of the present invention.

DETAILED DESCRIPTION OF THE PREFERRED EMBODIMENTS

First Embodiment

Figure 1:
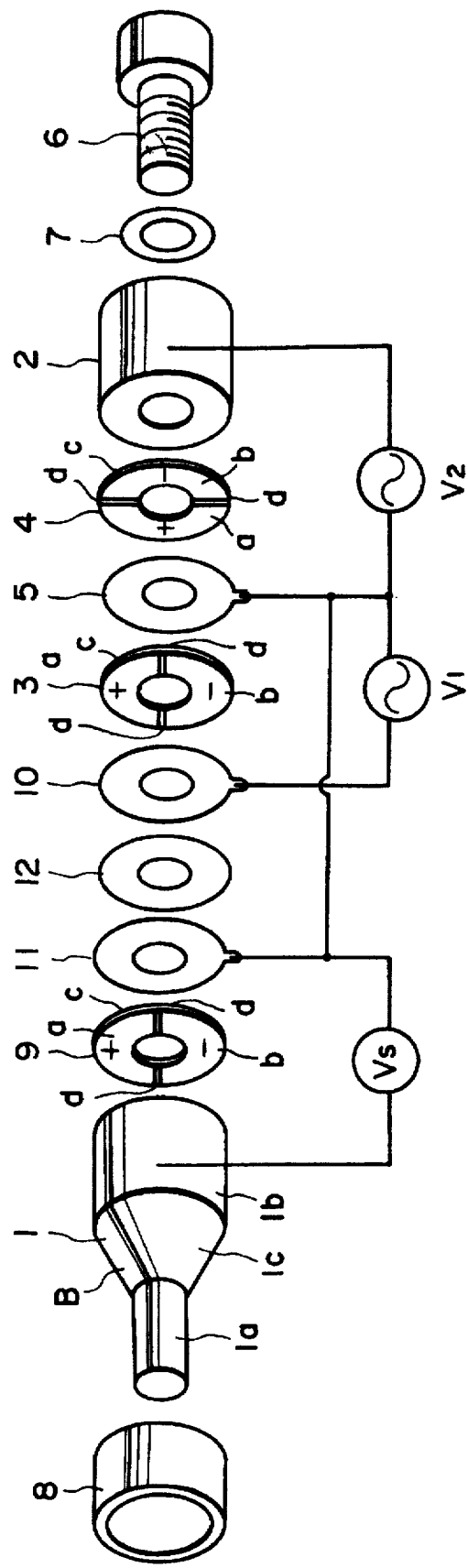
FIG. 1 is an exploded perspective view showing a first embodiment of the present invention.

FIG. 1 is an exploded perspective view of a vibration wave driven motor according to a first embodiment of the present invention. In FIG. 1, the reference numerals 1–8 are similar in significance to those in FIG. 13.

The reference numeral 9 designates a piezo-electric element as a vibration detecting element, the reference numeral 10 denotes an electrode plate for supplying electric power to the driving piezo-electric element 3, the reference numeral 11 designates an electrode plate for grounding the piezo-electric element 9, and the reference numeral 12 denotes an insulating member for holding the electrode plates 10 and 11 in a non-contact state.

The piezo-electric element 9 is of the same structure as the piezo-electric elements 3 and 4, and is disposed so that the positional phase thereof may coincide with that of the piezo-electric element 3.

Figure 13:
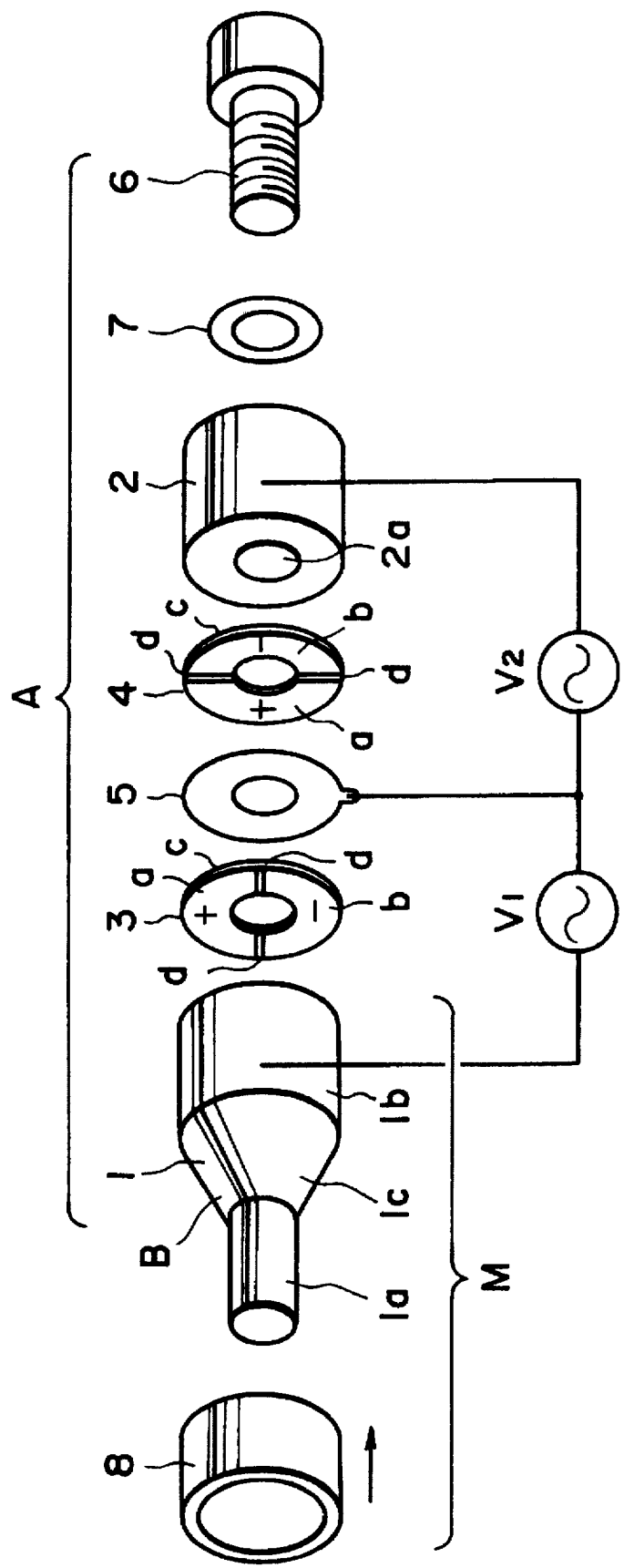
FIG. 13 is an exploded perspective view showing a motor according to the prior application.
Figure 14:
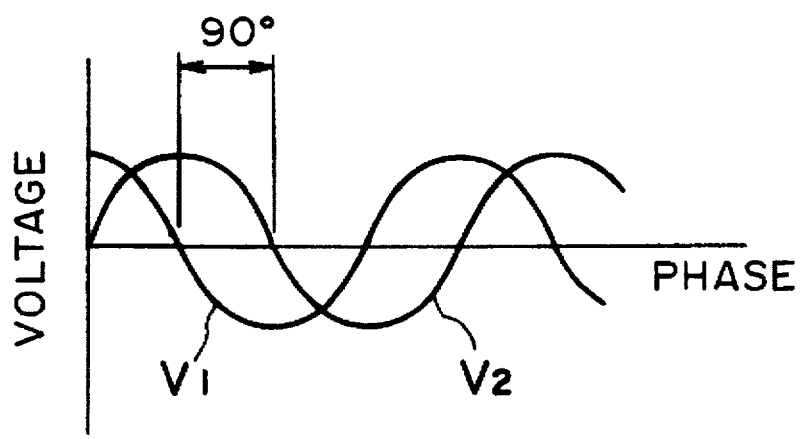
FIG. 14 shows the waveforms of AC voltages applied to piezo-electric element plates.
Figure 15:
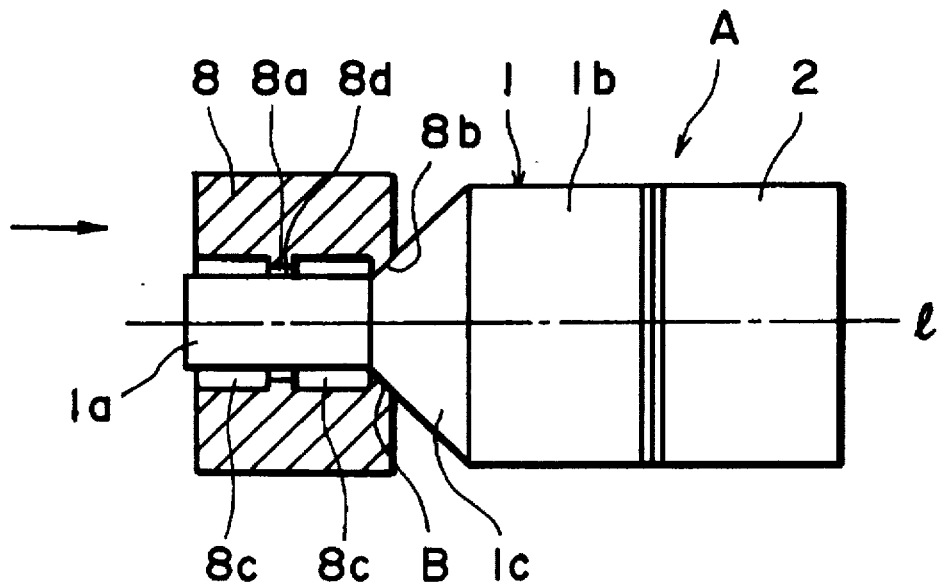
FIG. 15 is an assembly side view of the ultrasonic motor shown in FIG. 13.

The principle of driving is the same as that of the example shown in FIG. 13 and therefore need not be described.

Figure 2:
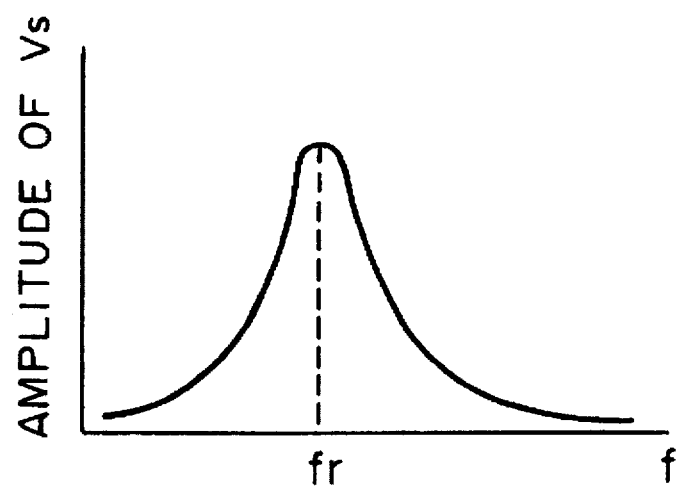
FIG. 2 is a graph showing the relation between a vibration detection signal and a frequency in the first embodiment.

FIG. 2 shows the frequency in the vicinity of a resonance frequency fr in the first embodiment versus the amplitude of the output signal of the piezo-electric element 9.

The output signal of the piezo-electric element 9 becomes maximum at the resonance frequency fr and decreases before and after it.

Consequently, it would occur to mind as a method of finding the resonance frequency fr to choose a frequency at which the amplitude of the output signal of the piezo-electric element 9 is maximum.

Figure 3:
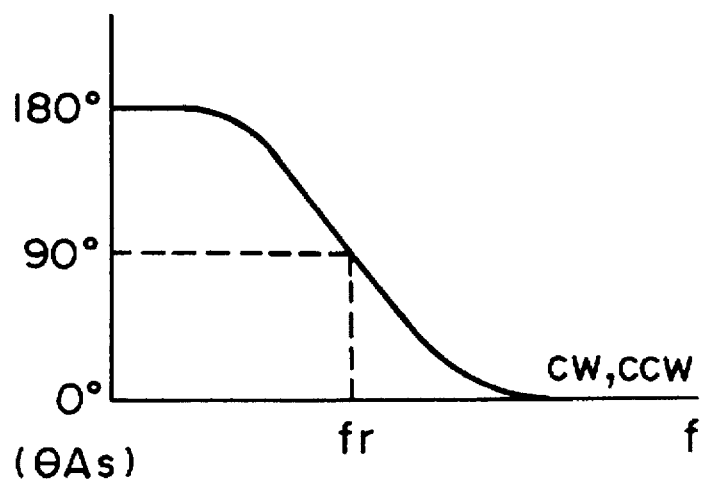
FIG. 3 is a graph showing the phase difference vs. frequency relation between the vibration detection signal and an input voltage in the first embodiment.

FIG. 3 shows the phase difference relation between the frequency vs. input voltage $V_1$ in the vicinity of the resonance frequency in the first embodiment and the output signal of the vibration detecting piezo-electric element 9.

As can be seen from FIG. 3, the phase difference between the input voltage $V_1$ and the output signal $V_S$ of the vibration detecting piezo-electric element 9 is 0° for a frequency higher than the resonance frequency, and gradually increases as the frequency approaches the resonance frequency, and becomes 90° for the resonance frequency fr, and increases to 180° for a frequency lower than the resonance frequency fr.

As regards said phase difference, the same phase relation is obtained in both cases of the clockwise direction of rotation CW and the counter-clockwise direction of rotation CCW because the piezo-electric element and the vibration detecting piezo-electric element 9 are disposed in a positional phase 0°. CW is a case where $V_1$ is advanced by 90° in terms of time with respect to $V_2$, and CCW is a case where $V_1$ is delayed with respect to $V_2$.

From the above-described phase relation, the frequency can be adjusted to the resonance frequency by controlling the frequency so that the phase difference between the input voltage $V_1$ to the piezo-electric element 3 and the output signal of the vibration detecting piezo-electric element 9 may become 90°.

Figure 4:
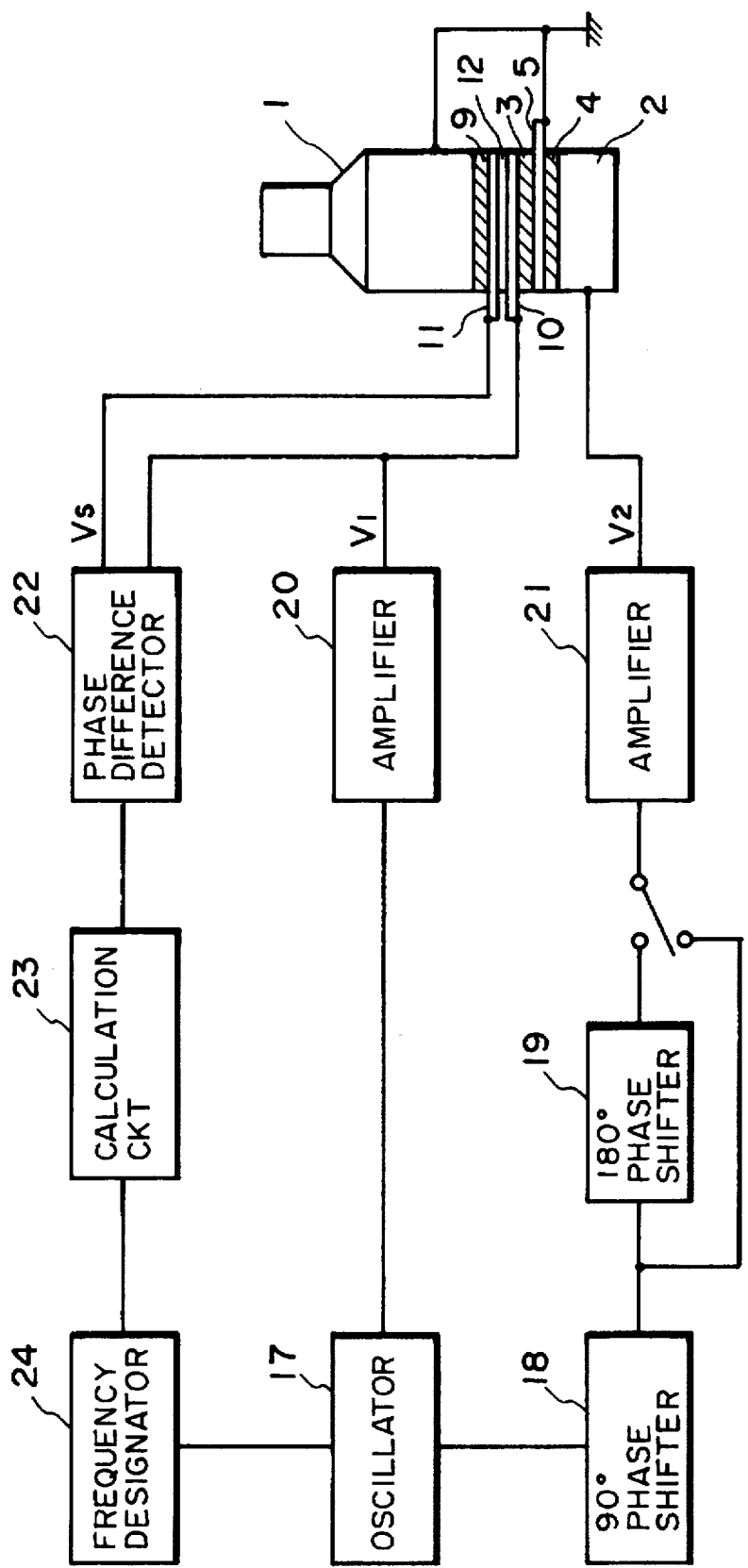
FIG. 4 is a block diagram of a control circuit in the first embodiment of the present invention.

FIG. 4 shows a block diagram of a control circuit in the above-described bar-shaped ultrasonic motor (vibration wave driven motor).

As oscillator 17 oscillates at a frequency determined by a signal generated by a frequency designator 24, and the output signal of the oscillator 17, together with a signal phase-shifted by 90° (or 270°) by phase shifter circuits 18 and 19, is amplified as two phases by amplifiers 20 and 21, whereafter it is input to the electrode plate 10 and the keep member 2. At this time, the keep member 2 must be an electrical conductor.

A signal from the vibration detecting piezo-electric element 9 is obtained from the electrode plate 11, and the phase difference thereof from the signal $V_1$ from the amplifier 20 is found in a phase difference detector 22.

Subsequently, how far said signal is from the resonance frequency fr is calculated by a calculation circuit 23, and the frequency designator 24 is varied.

The above-described operation is repeated, whereby it becomes possible to drive the motor with the frequency kept at the resonance frequency.

Also, the piezo-electric element 9 is circular and therefore can be provided with the resonance frequencies of vibrations in two directions kept coincident with each other, and the outer diameter thereof is equal to that of the vibrator or other driving piezo-electric element and therefore, by making uniform the outer diameter during assembly, it is easy to keep the coaxial relationship with other parts. Further, the piezo-electric element 9 used is the same as the driving piezo-electric element and therefore, it is not necessary to make a discrete part as the vibration detecting piezo-electric element and thus, an increase in cost can be minimized.

Second Embodiment

Figure 5:
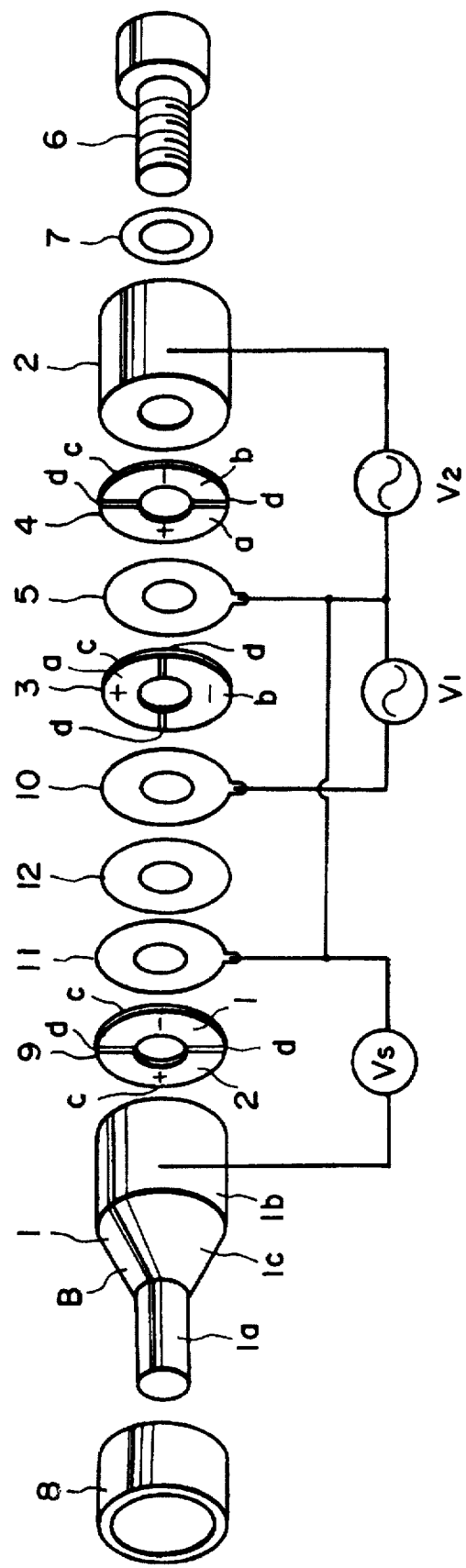
FIG. 5 is an exploded perspective view showing a second embodiment of the present invention.

FIG. 5 is an exploded perspective view of a vibration wave driven motor according to a second embodiment of the present invention.

In FIG. 5, the vibration detecting piezo-electric element 9 is disposed at a position which is positionally 90° out of phase with respect to the piezo-electric element 3. That is, it lies at a position of positional phase 0° with respect to the piezo-electric element 4. In the other points, the construction of the second embodiment is the same as that of the first embodiment.

In this embodiment, the amplitude of the frequency vs. the output of the piezo-electric element 9 is the same as that in the first embodiment.

Figure 6:
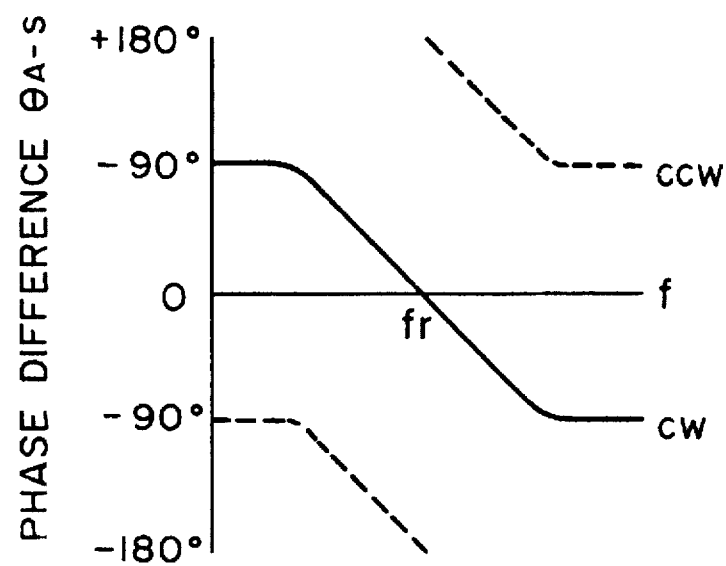
FIG. 6 is a graph showing the phase difference vs. frequency relation between a vibration detection signal and an input voltage in the second embodiment.

FIG. 6 shows the relation of the phase difference $\theta_{A-S}$ between the frequency vs. input voltage $V_1$ in the vicinity of the resonance frequency in the second embodiment and the output signal $V_S$ of the vibration detecting piezo-electric element.

As shown in FIG. 6, the phase difference $\theta_{A-S}$ between the input voltage $V_1$ to the piezo-electric element 3 and the output signal of the vibration detecting piezo-electric element 9 describes such a curve that it becomes 0° for the resonance frequency fr and in the case of CW (−180° in the case of CCW).

Consequently, when it is to be adjusted to the resonance frequency, the frequency can be controlled so that the phase difference $\theta_{A-S}$ may be 0° (−180° in the case of CCW).

Also, the area of the phase difference $\theta_{A-S}$ entirely differs between CW and CCW and therefore, CW or CCW can be known from $\theta_{A-S}$.

The first and second embodiments have been respectively shown with respect to a case where the vibration detecting piezo-electric element 9 is positionally 0° out of phase with respect to the piezo-electric element 3 and a case where the vibration detecting piezo-electric element 9 is positionally 90° out of phase with respect to the piezo-electric element 3, but even in the case of any other positional relation, there is obtained a certain definite relation for the phase difference $\theta_{A-S}$ between the input voltage $V_1$ and the output signal of the vibration detecting piezo-electric element 9.

Third Embodiment

Figure 7:
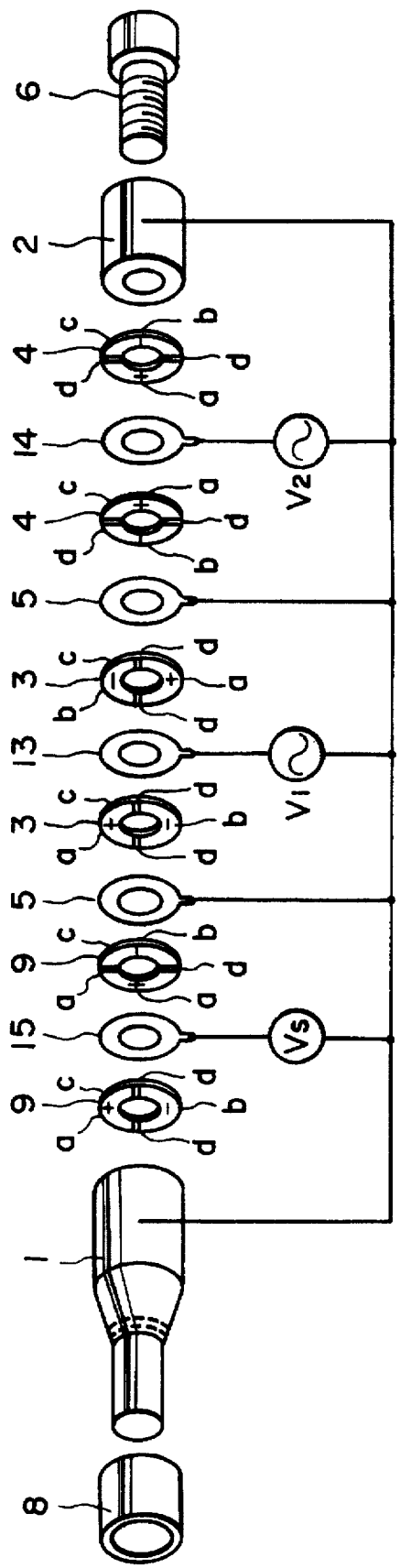
FIG. 7 is an exploded perspective view showing a third embodiment of the present invention.

FIG. 7 shows a third embodiment of the present invention.

In FIG. 7, the driving piezo-electric elements 3 and 4 each are laminated into two-sheet construction. It is known that if the driving piezo-electric elements are thus increased, the area used for the driving of the piezo-electric elements increases and low-voltage driving becomes possible.

The vibration detecting piezo-electric element 9 is also constructed of two sheets, and with regard to the positional phase thereof, one sheet is disposed at a position which is 0° out of phase with respect to the piezo-electric element 3 and the other sheet is disposed at a position which is 90° out of phase with respect to the piezo-electric element 3.

Figure 8:
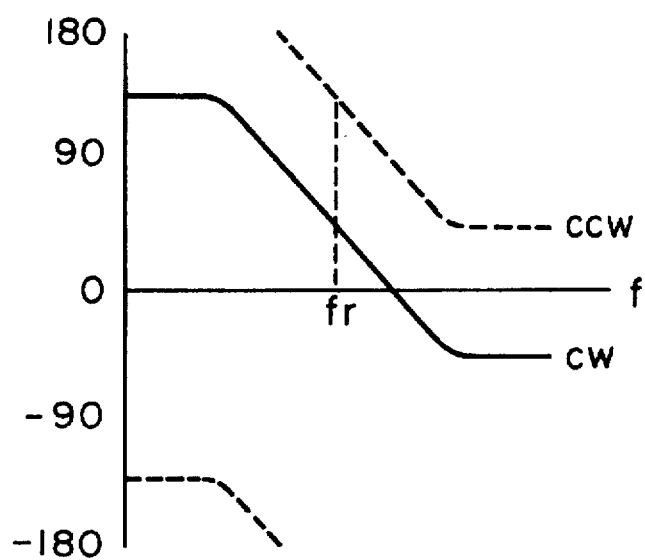
FIG. 8 is a graph showing the phase difference vs. frequency relation between a vibration detection signal and an input voltage in the third embodiment.

The phase difference $\theta_{A-S}$ between the output signal from the piezo-electric element 9 obtained from the electrode plate 15 at this time and the input voltage $V_1$ is such as shown in FIG. 8.

As can be seen from FIG. 8, the phase difference $\theta_{A-S}$ between the input signal $V_1$ and the output signal of the vibration detecting piezo-electric element 9 describes such a curve that it becomes +45° for the resonance frequency fr in the case of CW (+135° in the case of CCW).

Such a curve is the same as the curve when the vibration detecting piezo-electric element is one sheet and the positional phase thereof with respect to the driving piezo-electric element 3 is 45° out of phase. However, it differs in amplitude.

As described above, the vibration detecting piezo-electric element may be composed of a plurality of sheets, and in such case, various ways of taking out the output signal are possible depending on the way of determining the positional phase thereof.

Also, as compared with the case where the vibration detecting piezo-electric element is one sheet, a great output voltage can be taken out.

Moreover, if the driving and vibration detecting piezo-electric elements each are comprised of 2n sheets (n =1, 2, ...), there is the advantage that the insulator is unnecessary and moreover power supply can all be effected through the electrode plate.

Fourth Embodiment

FIG. 9 is a side view of a bar-shaped ultrasonic motor (vibration wave driven motor) according to a fourth embodiment of the present invention.

The reference numeral 16 designates a vibration detecting element formed, for example, of polyvinylidene fluoride and secured to the horn portion 1c of the vibration member 1 by an adhesive.

As in the above-described embodiments, a signal of a certain amplitude and in a certain phase relation is obtained from the vibration detecting element 16, and the relation thereof is determined by the location on which the vibration detecting element 16 is adhered.

The location where the vibration detecting element as described above is to be adhered may desirably be near the portion of contact between the vibration member and the movable member (rotor).

Alternatively, the vibration detecting element may be adhered on the rotor side.

In such case, the phase relation does not coincide with the signal being input to the stator for driving.

Consequently, such a control method that the amplitude becomes maximum would occur to mind.

Fifth Embodiment

FIG. 10 is a side view of a bar-shaped ultrasonic motor (vibration wave driven motor) according to a fifth embodiment of the present invention.

In this embodiment, the vibration detecting piezo-electric element 9 is provided in a portion of different diameter from the driving piezo-electric elements 3 and 4.

Where as shown in FIG. 10, the vibration detecting piezo-electric element 9 is provided in a portion of small diameter, the electrode area is small as compared with that in the first embodiment, etc. and therefore, the output voltage also becomes small.

Consequently, where in the first embodiment, etc., the vibration detection output voltage is too great and must be made small on the circuit side, the vibration detecting piezo-electric element 9 can be provided in a small-diametered portion of the vibration member.

Also, where conversely the vibration detection output voltage is small, a great output voltage will be obtained if the vibration detecting piezo-electric element is provided in a large-diametered portion of the vibration member.

Also, if in this case, a piezo-electric element of the same electrode pattern and having an outer diameter smaller than the inner diameter of the driving piezo-electric element or having an inner diameter greater than the outer diameter of the driving piezo-electric element is used for vibration detection, a driving piezo-electric element and a vibration detection piezo-electric element can be taken out from one sheet.

Sixth Embodiment

FIG. 11 shows various examples of the electrode pattern of the vibration detecting piezo-electric element 9.

The piezo-electric element 9 in the above-described first embodiment is of a doughnut-like shape having an electrode pattern as shown in FIG. 11D wherein two halves are polarized to plus (+) and minus (−), whereas where use is made of a piezo-electric element having an electrode pattern as shown in FIG. 11A, the output voltage can be made small to thereby obtain an effect similar to that of the above-described fifth embodiment because the electrode area is small.

The electrode pattern of FIG. 11B is an electrode pattern having, in addition to the above-described effect, a stress distribution which will hardly hamper the vibration of the vibration member.

The electrode pattern of FIG. 11C is polarized only in one half thereof, and has the advantage that the polarization of one half is only required when the piezo-electric element is made.

Figure 12:
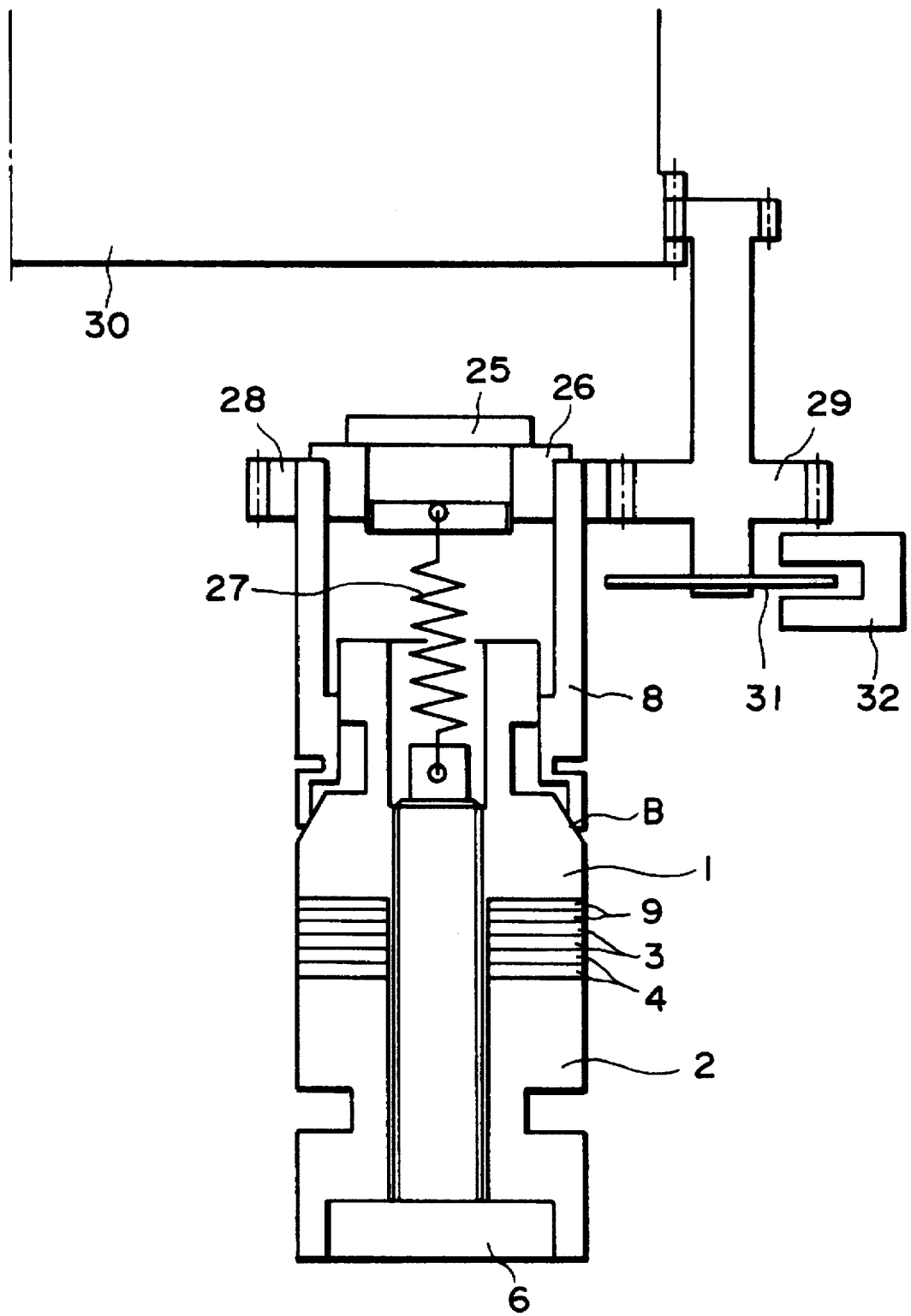
FIG. 12 shows a system incorporating the bar-shaped ultrasonic motor of the present invention therein.

FIG. 12 shows the construction of a system which uses the motor according to the present invention to drive the lens barrel or the like of an optical lens.

The reference numeral 25 designates a spring post portion, the reference numeral 26 denotes a rotation insulating member such as a bearing, and the reference numeral 27 designates a coil spring. The rotor 8 is pressed by the spring post portion 25 and the coil spring 27. The rotation of the rotor is insulated by the rotation insulating member 26, and the spring post portion 25 does not rotate.

The reference numeral 28 denotes a gear joined coaxially with the rotor 8. The gear 28 transmits a rotational output to a gear 29 to rotate a lens barrel 30 having a gear meshing with the gear 29.

An optical type encoder slit plate 31 is disposed coaxially with the gear 29 to detect the rotated positions and rotational speeds of the rotor 8 and the lens barrel 30, and the positions and speeds are detected by a photocoupler 32.

The piezo-electric element as an electro-mechanical energy conversion element in each embodiment may be replaced by an electrostrictive element.

What is claimed is:

1. A vibration driven motor comprising:

a) a vibrator;

b) a plurality of driving electro-mechanical energy conversion element portions including at least first and second driving electro-mechanical energy conversion element portions, said first driving electro-mechanical energy conversion element portion being disposed in said vibrator, and comprising a first section polarized in a first direction, and a second section polarized in a second direction different than the first direction, a first frequency electrical signal being applied to said first conversion element portion, said second driving electro-mechanical energy conversion element portion being disposed in said vibrator, and comprising a first section polarized in a third direction and a second section polarized in a fourth direction different from the third direction, a second frequency electrical signal different in phase from the first frequency electrical signal applied to said first conversion element portion being applied to said second conversion element portion, whereby respective first and second vibrations are generated in said vibrator, said first and second vibrations each having a bending mode of the same shape about an axis of vibration and having a phase difference in time therebetween; and c) a detecting electro-mechanical energy conversion element portion disposed in said vibrator, a polarization state of said electro-mechanical energy conversion element portion having an orientation that is asymmetric relative to at least one line that passes through the axis of vibration of said vibrator in a cross-sectional plane that is substantially perpendicular to the axis of vibration of said vibrator.

2. A vibration driven motor according to claim 1, wherein said first driving electro-mechanical energy conversion element portion and said second driving electro-mechanical energy conversion element portion are disposed with a different phase in location from each other.

3. A vibration driven motor according to claim 1, wherein said detecting electro-mechanical energy conversion element portion is disposed only on one side of said at least one line in the cross-sectional plane that is substantially perpendicular to the axis of vibration.

4. A vibration driven motor according to claim 1, wherein said detecting electro-mechanical energy conversion element portion has a first section polarized in a fifth direction and a second section polarized in a sixth direction different from the fifth direction.

5. A vibration driven motor according to claim 4, wherein said first and second sections are symmetrically disposed relative to said at least one line in the cross-sectional plane that is substantially perpendicular to the axis of vibration, and each of said first and second sections is disposed asymmetrically relative to said at least one line.

6. A vibration driven motor comprising:
   a) a vibrator;
   b) a plurality of driving electro-mechanical energy conversion element portions provided coaxially in said vibrator in a face-to-face relationship, frequency signals of different phases being applied to said conversion element portions; and
   c) a monitoring electro-mechanical energy conversion element provided in said vibrator coaxially of said conversion element portions, wherein said monitoring electro-mechanical energy conversion element is divided into two portions differing in the direction of polarization from each other.

7. A vibration driven motor according to claim 6, wherein said monitoring electro-mechanical energy conversion element is of a circular shape.

8. A vibration driven motor according to claim 7, wherein a plurality of said monitoring electro-mechanical energy conversion elements are provided.

9. A vibration driven motor including:
   a) a vibrator;
   b) a plurality of driving electro-mechanical energy conversion element portions including at least first and second driving electro-mechanical energy conversion element portions, said first driving electro-mechanical energy conversion element portion being disposed in said vibrator, and comprising a first section polarized in a first direction and a second section polarized in a second direction different from the first direction, a first frequency electrical signal being applied to said first conversion element portion, said second driving electro-mechanical energy conversion element portion being disposed in said vibrator, coaxially with said first driving electro-mechanical energy conversion element portion, said second driving electro-mechanical energy conversion element portion comprising a first section polarized in a third direction and a second section polarized in a fourth direction different from the third direction, a second frequency electrical signal different in phase from the first frequency electrical signal applied to said first conversion element portion being applied to said second conversion element portion, and said first conversion element portion and said second conversion element portion having a spacial phase difference therebetween; and
   c) a detecting electro-mechanical energy conversion element portion disposed in said vibrator, coaxially with said first and second driving electromechanical energy conversion element portions, a polarization state of said detecting electro-mechanical energy conversion element portion having an orientation that is asymmetric relative to at least one line that passes through an axis of vibration of said vibrator in a cross-sectional plane that is substantially perpendicular to the axis of vibration of said vibrator.

10. A vibration driven motor according to claim 9, wherein said vibrator is of a bar-like shape and a lateral shape of each of said first and second driving electromechanical energy conversion element portions is formed into a shape conforming to a lateral shape of said vibrator.

11. A vibration driven motor according to claim 10, wherein a lateral shape of said detecting electro-mechanical energy conversion element portion is formed into a shape conforming to a lateral shape of said vibrator.

12. A vibration driven motor according to claim 11, wherein said vibrator is partly formed into a cylindrical shape, and said first and second driving electro-mechanical energy conversion element portions are disposed in a predetermined cross-section of said cylindrically shaped portion.

13. A vibration driven motor according to claim 12, wherein said detecting electro-mechanical energy conversion element portion is disposed in a predetermined cross-section of said cylindrically shaped portion.

14. A vibration driven motor according to claim 9, wherein said detecting electro-mechanical energy conversion element portion is disposed only on one side of said at least one line in the cross-sectional plane that is substantially perpendicular to the axis of vibration.

15. A vibration driven motor according to claim 9, wherein said detecting electro-mechanical energy conversion element portion has a first section polarized in a fifth direction and a second section polarized in a sixth direction different from the fifth direction.

16. A vibration driven motor according to claim 9, wherein said second conversion element portion is disposed between said first conversion element portion and said detecting conversion element portion.

17. A vibration driven motor according to claim 9, wherein said vibrator comprises a first portion and a second portion disposed with its surface facing the surface of said first portion, and said first and second conversion element portions are disposed between said first portion and said second portion.

18. A vibration driven motor according to claim 17, wherein said detecting conversion element portion is disposed between said first portion and said second portion.

19. A vibration driven motor according to claim 18, wherein one surface of said first conversion element portion is disposed on the surface of said first portion, the other surface of said first conversion element portion is disposed in face-to-face relationship with one surface of said second conversion element portion with an electrode interposed therebetween, the other surface of said second conversion element portion is disposed in face-to-face relationship with one surface of an insulator with an electrode interposed therebetween, the other surface of said insulator is disposed in face-to-face relationship with one surface of said detecting conversion element portion, and the other surface of said detecting conversion element portion is disposed in face-to-face relationship with the surface of said second portion.

20. A vibration driven motor according to claim 9, wherein said first and second conversion element portions and said detecting conversion element portion each are formed by a plurality of conversion element portions being superposed one upon another.

21. A vibration driven motor including:
   a) a vibrator;
   b) a plurality of driving electro-mechanical energy conversion element portions including at least first and second driving electro-mechanical energy conversion element portions, said first driving electro-mechanical energy conversion element portion being disposed in said vibrator, and comprising a first section polarized in a first direction and a second section polarized in a second direction different from the first direction, a first frequency electrical signal being applied to said first conversion element portion, said second driving electro-mechanical energy conversion element portion being disposed in said vibrator, coaxially with said first driving electro-mechanical energy conversion element portion, said second driving electro-mechanical energy conversion element portion comprising a first section polarized in a third direction and a second section polarized in a fourth direction different from the third direction, a second frequency electrical signal different in phase from the first frequency electrical signal applied to said first conversion element portion being applied to said second conversion element portion, and said first conversion element portion and said second conversion element portion having a spacial phase difference therebetween; and c) a detecting electro-mechanical energy conversion element portion disposed in said vibrator, coaxially with said first and second driving electro-mechanical energy conversion element portions, wherein said detecting electro-mechanical energy conversion element portion comprises a first portion and a second portion differing in the direction of polarization from each other, and said detecting conversion element portion and said first conversion element portion are disposed so that their polarization phases may be the same.

22. An apparatus provided with a vibration driven motor, said apparatus comprising:

a) a vibrator;

b) a plurality of driving electro-mechanical energy conversion element portions including at least first and second driving electro-mechanical energy conversion element portions, said first driving electro-mechanical energy conversion element portion being disposed in said vibrator, and comprising a first section polarized in a first direction, and a second section polarized in a second direction different from the first direction, a first frequency electrical signal being applied to said first conversion element portion, said second driving electro-mechanical energy conversion element portion being disposed in said vibrator, and comprising a first section polarized in a third direction and a second section polarized in a fourth direction different from the third direction, a second frequency electrical signal different in phase from the first frequency electrical signal applied to said first conversion element portion being applied to said second conversion element portion, whereby respective first and second vibrations are generated in said vibrator, said first and second vibrations each having a bending mode of the same shape about an axis of vibration and having a phase difference in time therebetween; and c) a detecting electro-mechanical energy conversion element portion disposed in said vibrator and having a polarization state, the polarization state of said detecting electro-mechanical energy conversion element having an orientation that is asymmetric relative to at least one line that passes through the axis of vibration of said vibrator in a cross-sectional plane that is substantially perpendicular to the axis of vibration of said vibrator.

23. An apparatus according to claim 22, wherein said first driving electro-mechanical energy conversion element portion and said second driving electro-mechanical energy conversion element portion are disposed with a different phase in location from each other.

24. An apparatus according to claim 22, wherein said detecting electro-mechanical energy conversion element portion is disposed only on one side of said at least one line in the cross-sectional plane that is substantially perpendicular to the axis of vibration.

25. An apparatus according to claim 22, wherein said detecting electro-mechanical energy conversion element portion has a first section polarized in a fifth direction and a second section polarized in a sixth direction different from the fifth direction.

26. An apparatus according to claim 25, wherein said first and second sections are symmetrically disposed relative to said at least one line in the cross-sectional plane that is substantially perpendicular to the axis of vibration, and each of said first and second sections is disposed asymmetrically relative to said at least one line.

27. An apparatus provided with a vibration driven motor, said apparatus comprising:

a) a vibrator;

b) a plurality of driving electro-mechanical energy conversion element portions disposed coaxially in a face-to-face relationship relative to said vibrator, frequency signals of different phases being applied to said conversion element portions;

c) a monitoring electro-mechanical energy conversion element provided in said vibrator coaxially of said conversion element portions; and d) an adjusting circuit for adjusting the frequency signals on the basis of the output of said monitoring electro-mechanical energy conversion element, wherein said monitoring electro-mechanical energy conversion element is divided into the two portions differing in the direction of polarization from each other.

28. A apparatus according to claim 27, wherein said monitoring electro-mechanical energy conversion element is of a circular shape.

29. An apparatus according to claim 28, wherein a plurality of said monitoring electro-mechanical energy conversion elements are provided.

30. An apparatus provided with a vibration driven motor, said apparatus comprising:

a) a vibrator;

b) a plurality of driving electro-mechanical energy conversion element portions including at least first and second driving electro-mechanical energy conversion element portions, said first driving electro-mechanical energy conversion element portion being disposed in said vibrator, and comprising a first section polarized in a first direction and a second section polarized in a second direction different from the first direction, a first frequency electrical signal being applied to said first conversion element portion, said second driving electro-mechanical energy conversion element portion being disposed in said vibrator, coaxially with said first driving electro-mechanical energy conversion element portion, and comprising a first section polarized in a third direction and a second section polarized in a fourth direction different from the third direction, a second frequency electrical signal differing in phase from the first frequency electrical signal applied to said first conversion element portion being applied to said second conversion element portion, said second conversion element portion and said first conversion element portion having a spacial phase difference therebetween;

c) a detecting electro-mechanical energy conversion element portion disposed in said vibrator, coaxially with said energy conversion element portions, a polarization state of said detection electro-mechanical energy conversion element portion having an orientation that is asymmetric relative to at least one line that passes through an axis of vibration of said vibrator in a cross-sectional plane that is substantially perpendicular to the axis of vibration of said vibrator; and d) an adjusting circuit for adjusting the first and second frequency electrical signals on the basis of an output of said detecting electro-mechanical energy conversion element.

31. An apparatus according to claim 30, wherein said vibrator is of a bar-like shape and a lateral shape of each of said first and second driving electro-mechanical energy conversion element portions is formed into a shape conforming to a lateral shape of said vibrator.

32. An apparatus according to claim 31, wherein a lateral shape of said detecting electro-mechanical energy conversion element portion is formed into a shape conforming to a lateral shape of said vibrator.

33. An apparatus provided with a vibration driven motor, said apparatus comprising:

a) a vibrator;

b) a plurality of driving electro-mechanical energy conversion element portions including at least first and second driving electro-mechanical energy conversion element portions, said first driving electro-mechanical energy conversion element portion being disposed in said vibrator, and comprising a first section polarized in a first direction and a second section polarized in a second direction different from the first direction, a first frequency electrical signal being applied to said first conversion element portion, said second driving electro-mechanical energy conversion element portion being disposed in said vibrator, coaxially with said first driving electro-mechanical energy conversion element portion, and comprising a first section polarized in a third direction and a second section polarized in a fourth direction different from the third direction, a second frequency electrical signal differing in phase from the first frequency electrical signal applied to said first conversion element portion being applied to said second conversion element portion, said second conversion element portion and said first conversion element portion having a spacial phase difference therebetween;

c) a detecting electro-mechanical energy conversion element portion disposed in said vibrator, coaxially with said energy conversion element portions,
wherein said detecting electro-mechanical energy conversion element portion comprises a first portion and a second portion differing in the direction of polarization from each other, and said detecting conversion element portion and said first conversion element portion are disposed so that their polarization phases may be the same; and d) an adjusting circuit for adjusting the first and second frequency electrical signals on the basis of an output of said detecting electro-mechanical energy conversion element.

34. A vibration type driving device comprising:

a) a vibrator;

b) a plurality of driving electro-mechanical energy conversion element portions provided in the vibrator, frequency signals being applied to said conversion element portions; and c) a monitoring electro-mechanical energy conversion element provided at said vibrator, said monitoring electro-mechanical conversion element having first and second portions whose direction of polarization is different from each other.

35. A vibration driven motor comprising:

a) a vibrator;

b) a plurality of driving electro-mechanical energy conversion element portions including at least first and second driving electro-mechanical energy conversion element portions, said first driving electro-mechanical energy conversion element portion being disposed in said vibrator, and comprising a first section polarized in a first direction and a second section polarized in a second direction different from the first direction, a first frequency electrical signal being applied to said first conversion element portion, said second driving electro-mechanical energy conversion element portion being disposed in said vibrator, and comprising a first section polarized in a third and a second section polarized in a fourth direction different from the third direction, a second frequency electrical signal different in phase from the first frequency electrical signal applied to said first conversion element portion being applied to said second conversion element portion, said first electro-mechanical energy conversion element portion and said second electro-mechanical energy conversion element portion having a spacial phase difference therebetween; and c) a detecting electro-mechanical energy conversion element portion disposed in said vibrator and having a polarization state, the polarization state of said detecting electro-mechanical energy conversion element portion having an orientation that is asymmetric relative to at least one line that passes through an axis of vibration of said vibrator in a cross-sectional plane that is substantially perpendicular to the axis of vibration of said vibrator.

36. A vibration driven motor according to claim 34, wherein said detecting electro-mechanical energy conversion element portion is disposed only on one side of said at least one line in the cross-sectional plane that is substantially perpendicular to the axis of vibration.

37. A vibration driven motor according to claim 35, wherein said detecting electro-mechanical energy conversion element portion has a first section polarized in a fifth direction and a second section polarized in a sixth direction different from the fifth direction.

38. A vibration driven motor according to claim 37, wherein said first and second sections are symmetrically disposed relative to said at least one line in the cross-sectional plane that is substantially perpendicular to the axis of vibration, and each of said first and second sections is disposed asymmetrically relative to said at least one line.

39. A vibration driven motor according to claim 15, wherein said first and second sections are symmetrically disposed relative to said at least one line in the cross-sectional plane that is substantially perpendicular to the axis of vibration, and each of said first and second sections is disposed asymmetrically relative to said at least one line.

40. An apparatus provided with a vibration driven motor, said apparatus comprising:

a) a vibrator;

b) a plurality of driving electro-mechanical energy conversion element portions including at least first and second driving electro-mechanical energy conversion element portions, said first driving electro-mechanical energy conversion element portion being disposed in said vibrator, and comprising a first section polarized in a first direction and a second section polarized in a second direction different from the first direction, a first frequency electrical signal being applied to said first conversion element portion, said second driving electro-mechanical energy conversion element portion being disposed in said vibrator, and comprising a first section polarized in a third direction and a second section polarized in a fourth direction different from the third direction, a second frequency electrical signal different in phase from the first frequency electrical signal applied to said first conversion element portion being applied to said second conversion element portion, said first electro-mechanical energy conversion element portion and said second electro-mechanical energy conversion element portion having a spacial phase difference therebetween; and c) a detecting electro-mechanical energy conversion element portion disposed in said vibrator and having a polarization state, the polarization state of said detecting electro-mechanical energy conversion element portion having an orientation that is asymmetric relative to at least one line that passes through an axis of vibration of said vibrator in a cross-sectional plane that is substantially perpendicular to the axis of vibration of said vibrator.

41. An apparatus according to claim 40, wherein said detecting electro-mechanical energy conversion element portion is disposed only on one side of said at least one line in the cross-sectional plane that is substantially perpendicular to the axis of vibration.

42. An apparatus according to claim 40, wherein said detecting electro-mechanical energy conversion element portion has a first section polarized in a fifth direction and a second section polarized in a sixth direction different from the fifth direction.

43. An apparatus according to claim 42, wherein said first and second sections are symmetrically disposed relative to said at least one line in the cross-sectional plane that is substantially perpendicular to the axis of vibration, and each of said first and second sections is disposed asymmetrically relative to said at least one line.

44. A vibration driven motor comprising:
a) a vibrator;
b) a driving electro-mechanical energy conversion element portion disposed in said vibrator, said portion including at least a first section polarized in a first direction, a second section polarized in a second direction different from the first direction, a third section polarized in a third direction, and a fourth section polarized in a fourth direction different from the third direction, a first frequency electrical signal being applied to the first and second sections, and a second frequency electrical signal different in phase from the first frequency electrical signal being applied in the third and fourth sections; and
a detecting electro-mechanical energy conversion element portion disposed in said vibrator and having a polarization state, the polarization state of said detecting electro-mechanical energy conversion element portion having an orientation that is asymmetric relative to at least one line that passes through an axis of vibration of said vibrator in a cross-sectional plane that is substantially perpendicular to the axis of vibration of said vibrator.

45. A vibration driven motor according to claim 36, wherein said detecting electro-mechanical energy conversion element portion is disposed only on one side of said at least one line in the cross-sectional plane that is substantially perpendicular to the axis of vibration.

46. A vibration driven motor according to claim 44, wherein said detecting electro-mechanical energy conversion element portion has a first section polarized in a fifth direction and a second section polarized in a sixth direction different from the fifth direction.

47. A vibration driven motor according to claim 46, wherein said first and second sections are symmetrically disposed relative to said at least one line in the cross-sectional plane that is substantially perpendicular to the axis of vibration, and each of said first and second sections is disposed asymmetrically relative to said at least one line.

48. A vibration driven motor comprising:
(a) a vibrator;
(b) a plurality of driving electro-mechanical energy conversion element portions provided coaxially in said vibrator in a face-to-face relationship, frequency signals being applied to said conversion element portions; and
(c) a detecting electro-mechanical energy conversion element disposed in said vibrator, a polarization state of said detecting electro-mechanical energy conversion element being asymmetric relative to at least one line that passes through a center axis of said vibrator in a cross-sectional plane that is substantially perpendicular to the center axis of said vibrator, to detect a bending vibration of said vibrator.

49. A vibration driven motor according to claim 48, wherein said detecting electro-mechanical energy conversion element is disposed only on one side of said at least one line.

50. A vibration driven motor or an apparatus having an object which is to be driven by said vibration driven motor comprising:
a) a vibrator;
b) a driving electro-mechanical energy conversion element portion disposed in said vibrator, said portion including at least a first section polarized in a first direction, a second section polarized in a second direction different from the first direction, a third section polarized in a third direction, and a fourth section polarized in a fourth direction different from the third direction, a first frequency electrical signal being applied to the first and second sections, and a second frequency electrical signal different in phase from the first frequency electrical signal being applied in the third and fourth sections; and
c) a detecting electro-mechanical energy conversion element portion disposed in said vibrator, wherein said detecting electro-mechanical energy conversion element portion is disposed on a plane substantially perpendicular to a vibration axis of said vibrator and arranged in such a manner that respective areas of two sides of said detecting electro-mechanical energy conversion element portion facing each other relative to at least a predetermined line passing through said vibration axis are different.

51. A vibration driven motor or an apparatus having an object which is to be driven by said vibration driven motor comprising:
a) a vibrator;
b) a driving electro-mechanical energy conversion element portion disposed in said vibrator, said portion including at least a first section polarized in a first direction, a second section polarized in a second direction different from the first direction, a third section polarized in a third direction, and a fourth section polarized in a fourth direction different from the third direction, a first frequency electrical signal being applied to the first and second sections, and a second frequency electrical signal different in phase from the first frequency electrical signal being applied in the third and fourth sections; and c) a detecting electro-mechanical energy conversion element portion disposed on a plane substantially perpendicular to a vibration axis of said vibrator at one side of a line which passes through the vibration axis.

52. A vibration driven motor or an apparatus having an object which is to be driven by said vibration driven motor;

a) a vibrator;

b) a plurality of driving electro-mechanical energy conversion element portions provided coaxially in said vibrator in a face-to-face relationship, frequency signals being applied to said conversion element portions; and c) a detecting electro-mechanical energy conversion element portion disposed in said vibrator, wherein said detecting electro-mechanical energy conversion element portion is disposed on a plane substantially perpendicular to a vibration axis of said vibrator and arranged in such a manner that respective areas of two sides of said element portion facing each other relative to at least a predetermined line passing through said vibration axis are different.

53. A vibration driven motor or an apparatus having an object which is to be driven by said vibration driven motor;

a) a vibrator;

b) a plurality of driving electro-mechanical energy conversion element portions provided coaxially in said vibrator in a face-to-face relationship, frequency signals being applied to said conversion element portions; and c) a detecting electro-mechanical energy conversion element portion disposed on a plane substantially perpendicular to a vibration axis of said vibrator at one side of a line which passes through the vibration axis.

54. An apparatus according to claim 32, wherein said vibrator is partly formed into a cylindrical shape, and said first and second driving electro-mechanical energy conversion element portions are disposed in a predetermined cross-section of said cylindrically shaped portion.

55. An apparatus according to claim 54, wherein said detecting electro-mechanical energy conversion element portion is disposed in a predetermined cross-section of said cylindrically shaped portion.

56. An apparatus according to claim 30, wherein said second conversion element portion is disposed between said first conversion element portion and said detecting conversion element portion.

57. An apparatus according to claim 30, wherein said vibrator comprises a first portion and a second portion disposed with a face-to-face relationship between the surface of said first and second portions, and said first and second conversion element portions are disposed between said first portion and said second portion comprising said vibrator.

58. An apparatus according to claim 57, wherein said detecting conversion element portion is disposed between said first portion and said second portion comprising said vibrator.

59. An apparatus according to claim 58, wherein one surface of said first conversion element portion is disposed on the surface of said first portion comprising said vibrator, the other surface of said first conversion element portion is disposed in face-to-face relationship with one surface of said second conversion element portion with an electrode interposed therebetween, the other surface of said second conversion element portion is disposed in face-to-face relationship with one surface of an insulator with an electrode interposed therebetween, the other surface of said insulator is disposed in face-to-face relationship with one surface of said detecting conversion element portion, and the other surface of said detecting conversion element portion is disposed in face-to-face relationship with the surface of said second portion comprising said vibrator.

60. An apparatus according to claim 30, wherein said first and second conversion element portions and said detecting conversion element portion each are formed by a plurality of conversion element portions being superposed one upon another.

61. An apparatus according to claim 30, wherein said detecting electro-mechanical energy conversion element portion is disposed only on one side of said at least one line in the cross-sectional plane that is substantially perpendicular to the axis of vibration.

62. An apparatus according to claim 30, wherein said detecting electro-mechanical energy conversion element portion has a first section polarized in a fifth direction and a second section polarized in a sixth direction different from the fifth direction.

63. An apparatus according to claim 62, wherein said first and second sections are symmetrically disposed relative to said at least one line in the cross-sectional plane that is substantially perpendicular to the axis of vibration, and each of said first and second sections is disposed asymmetrically relative to said at least one line.

* * * * *

UNITED STATES PATENT AND TRADEMARK OFFICE
CERTIFICATE OF CORRECTION

PATENT NO. : 5,656,881          Page 1 of 2
DATED      : August 12, 1997
INVENTOR(S): AKIO ATSUTA It is certified that error appears in the above-indentified patent and that said Letters Patent is hereby corrected as shown below:

At [56] References Cited, Foreign Patent Documents

"1148079 of 1989 Japan" should read --1-148079  1989 Japan--.

Column 1

Line 66, "to" should be deleted.

Column 2

Line 1, "to" should be deleted.
Line 49, "permitted" should read --permitted to--.

Column 9

Line 51, "electromechanical" should read --electro-mechanical--.

Column 12

Line 29, "A" should read --An--.

Column 14

Line 15, "third" should read --third direction--.
Line 34, "claim 34," should read --claim 35,--.

UNITED STATES PATENT AND TRADEMARK OFFICE
CERTIFICATE OF CORRECTION

PATENT NO.  : 5,656,881  Page 2 of 2
DATED       : August 12, 1997
INVENTOR(S) : AKIO ATSUTA It is certified that error appears in the above-indentified patent and that said Letters Patent is hereby corrected as shown below:

<u>Column 17</u>

Line 12, "motor;" should read --motor, comprising:--.
    Line 29, "motor;" should read --motor, comprising:--.

Signed and Sealed this

Seventeenth Day of February, 1998

Attest:

BRUCE LEHMAN

*Attesting Officer*  *Commissioner of Patents and Trademarks*